May 24, 1960

L. L. TROUSSE 2,937,501

COMBUSTION DEVICES FOR RAM-JET ENGINES

Filed May 4, 1956

May 24, 1960 L. L. TROUSSE 2,937,501
COMBUSTION DEVICES FOR RAM-JET ENGINES
Filed May 4, 1956 3 Sheets-Sheet 3

United States Patent Office 2,937,501
Patented May 24, 1960

2,937,501

COMBUSTION DEVICES FOR RAM-JET ENGINES

Lucien Louis Trousse, La Roquette, St.-Jean, France, assignor to Sud-Aviation Societe Nationale de Constructions Aeronautiques, Paris, France Filed May 4, 1956, Ser. No. 582,777

Claims priority, application France July 13, 1955

11 Claims. (Cl. 60—39.82)

The present invention relates to a combustion device for ram-jet engines and more particularly for supersonic ram-jet engines, i.e. ram-jet engines adapted to work at velocities superior to that of sound, the diffusor of such engines having, or not, a central core shaped in accordance with a linear law of section variations, being, f.i. conical or not.

Ram-jet engines of known models do not always admit supersonic velocities, either because they fail to ignite at a high Mach number or, in case ignition be possible, because the flame will lack stability due to considerable changes of the richness of the mixture which may occur when the airplane flying line changes from a vertical to a horizontal direction. Such varying flying conditions correspond to a rapid succession of accelerating and slowing down phases, requiring, in fact, very important changes in the richness of the mixture injected without impairing the stability of the flame, which result cannot be achieved, for instance, by means of the well-known V-shaped annular stabilizers which will only work within a very narrow margin of mixture composition or richness. The injection richness of a ram-jet engine corresponds to the product of a constant value depending on the type of fuel by the ratio between the amount of injected fuel and the weight of air passing through the apparatus, said product permitting, for any given combustion device, to determine the outlet temperature and consequently the thrust which only reaches its maximum value when the loss of head remains minimal and a good combustion efficiency is obtained due to a high ratio between the amount of fuel actually burnt and the amount injected. The combustion device must, moreover, be of limited length so as to give the maximum length to any given design of the combustion chamber.

In order to avoid the above drawbacks and to satisfy at the same time the optimum working condition as stated, the main object of the present invention is to provide a combustion device for supersonic ram-jet engines, characterized by the fact that it comprises a multiplicity of primary or pilot combustion devices, located at such places where the air velocity is very low and ignited by means of a central igniting device adapted to be operative at high speed, and a main fuel injection assembly lodged in the intervals left by the pilot combustion devices.

According to an advantageous embodiment of the invention, the combustion device comprises a multiplicity of radially disposed pilot combustion devices which are formed by small subsonic ram-jet devices said pilot devices being ignited by means of a central device adapted to be operative at high speed and connected to said small subsonic ram-jet devices by means of radial flame-tubes, the main fuel injection assembly consisting of a multiplicity of main injectors located substantially within the narrowest section of the air passage between the outside walls of said small subsonic ram-jet devices.

The output regulating device is preferably lodged inside the radially disposed group of small subsonic ram-jet devices. The pilot combustion devices have a determined shape which is preferably flattened and streamlined in such a way that the small drag generated by said subsonic ram-jet devices reduces to a minimum the loss of head of the whole of the combustion device.

Substantially within the narrowest section of the intervals between each two adjacent subsonic ram-jet devices there is at least one injection tube and/or at least one group of injection tubes with multiple spray holes, each tube or group of tubes being arranged so as to provide for an appropriate distribution of the fuel through the mass of air passing at said section in accordance with the number of sections and their shape. The tubes and/or groups of tubes are distributed along annular distributing devices which are fed with fuel independently from each other so as to give, jointly with the injection pressure, a means for controlling the combustion according to altitudes cutting out one or more of said distributing devices.

In case the device comprises eight flattened and streamlined subsonic ram-jet devices, the main injection system will include a radial I-shaped injector and a V-shaped injector located at the rear of the former.

Another object of the present invention concerns the industrial applications of the above specified combustion device for supersonic ram-jet engines, more particularly to such ram-jet engines having diffusors without central core, said combustion device being, in such a case, mounted substantially about the end part of the diffusor and secured on the cylindrical wall of the ram-jet engine, the central front part of which is protected by a conical shield, or conversely within such ram-jet engines having an axial central core the front and rear ends of which are shaped in accordance with a linear law of section variations, such as a conical shape or not, in which case the combustion device is mounted on the tapered rear end of said central core.

Additional objects of this invention will appear in the course of the following description, with reference to the accompanying drawings given only by way of non limitative examples, which description will make it clear how the invention may be put into practice, it being understood that all features of the devices mentioned belong to the invention. In the drawings.

Figure 1:
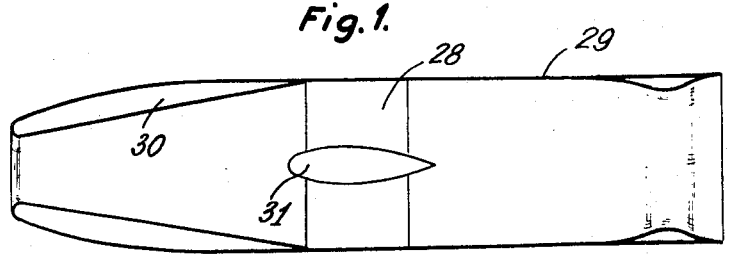
Fig. 1 is a schematic section of a supersonic ram-jet engine comprising a diffusor and without a central core, said engine including a combustion device in accordance with the invention.

As will be seen on Figs. 1 to 5, the combustion device in accordance with the invention comprises a multiplicity of primary or pilot combustion devices A, numbering eight in the example shown and radially disposed around a central device B permitting the ignition of said combustion devices at high velocity and a main fuel injection assembly the elements of which are lodged in the intervals C which separate the pilot combustion devices A.

Each pilot combustion device A is made up by streamlined members shaped in the form of flattened subsonic ram-jet devices, within which a very reduced air velocity is prevailing at the rear end of the diffusor. Said streamlined members are built up (see Fig. 7) by an outside wall 1, a subsonic diffusor 2, a flame stabilizer of dihedral shape and a radial injection tube 4 with perforations 5 (see Fig. 4) so as to produce fuel jets directed in counter-current to the air stream, said injection tube being positioned in front of the flame stabilizer 3. The outside profile of the wall entails only small losses of head and due to the very small air speed prevailing at the end stage of diffusor 2, the flame steadiness is a very good one, even in case great air velocities are prevailing around said members and whatever be the richness of injection. The pilot combustion devices have their injection tubes mounted on a hollow circular torus 6 fed with fuel through a tube 7.

By radially positioning a series of pilot combustion devices instead of having the usual big central pilot flame obtained by means of a single central ram-jet device extending the diffusor of the supersonic ram-jet engine proper, it becomes now possible to obtain, for any given design, a combustion chamber within which a space D is provided.

Figure 6:
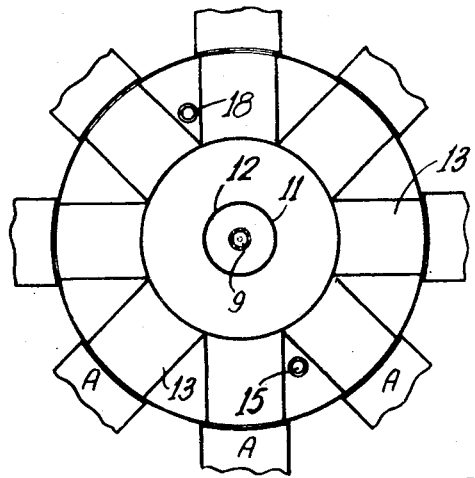
Fig. 6 is on a larger scale a section of Fig. 5 along the line VI—VI.

The ignition outfit B (Figs. 5 and 6) comprises one or more powder or magnesium chemical ignitors 8, which lead the flame up to the fuel injected through a central injector 9 axially directed and having radially disposed holes into a chamber 10 where the velocity of air is practically nil and which acts as a means for protecting the ignition outfit B against the air flow passage through the supersonic ram-jet engine. The fuel injector 9 is protected against the flame of the ignitor by means of a conical flame-guard element 11 formed with perforations 12. Said perforations allow for the passage of the fuel jets which are thus directed to flame tubes 13 opening behind the flame-stabilizers or baffles 3 of the pilot combustion devices A.

In order to obtain an appropriate distribution of the fuel in the mass of air passing through the narrowest cross-sections of the intervals existing between the subsonic ram-jet devices in accordance to the number and shape of said sections, the main fuel injection assembly comprises, for each interval, a group of injectors including a first injector located in said narrowest cross-section and a second injector located downwards of the first one, having a radial length and a transverse width greater than those of said first injector and only provided with injection holes on its parts projecting laterally and radially beyond said first injector.

The main injection takes place (Figs. 4 and 5) in the intervals C left between the pilot combustion devices A and having the shape of sectors of a circle. Said main injection is accomplished by means of two circular series of injectors. The first one comprises a circular hollow torus-shaped member 14 fed with fuel through a tube 15 and provided with radial main I-shaped injectors 16 which are located substantially about the narrowest section of the air passages between the outside walls of the small subsonic flattened ram-jet devices A. The second circular series of injectors comprises a hollow torus-shaped member 17 fed with fuel through a tube 18, independently from the torus-shaped member 14 and provided with main V-shaped injectors located close to the I-shaped injectors 16.

Figure 10:
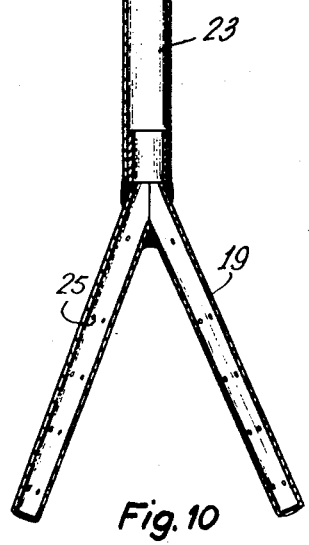
Figs. 9 and 10 are axial sections of the main I-shaped and V-shaped injectors.
Figure 9:
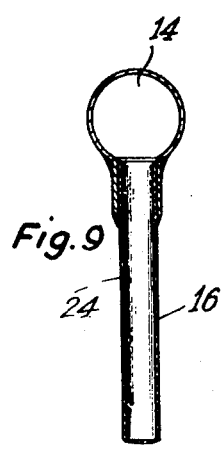

In order to reduce the effect of the intense heat resulting from the ignition device, the bottom parts of the main injectors 16 and 19 as well as the circular fuel feeders 14 and 17 are protected by an asbestos packing 20 (Fig. 5) disposed around the ignition chamber 10 and the flame tubes 13 within a casing 21 which limits the bottom of the small subsonic ram-jet devices. A streamlined member 22 (Figs. 5 and 6) protects, on the other hand, the radial junction 23 of each V-shaped injector 19. Injectors 16 and 19 are each perforated with holes 24 and 25 (Figs. 9 and 10) through which fuel is spread at angles which may vary between 0 and 90° against the airstream. The circular fuel feeders 14 and 17 may be fed with fuel independently from each other, said independent fuel feed and the adjustment of the injection pressure giving ample possibility for combustion control to conform to altitude.

Figure 7:
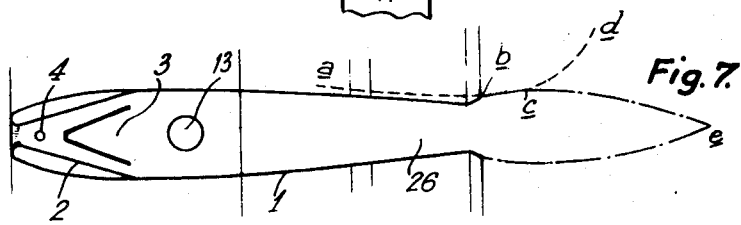
Fig. 7 is a longitudinal section of a small flattened subsonic ram-jet device.
Figure 8:
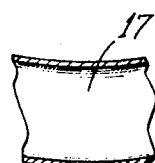
Fig. 8 is a cross-section of a main injector provided with its protective streamlined member.

The mixing of fuel and air for the main injection assembly is completed on the path $a$ to $b$ illustrated by a dotted line in Fig. 7. The mixture is heated up by contacting the pilot flame of the small subsonic flattened ram-jet devices along the path $b$ to $c$, so as to reach its ignition temperature at $c$ and build the flame front $cd$. The volume occupied by the pilot flame and which is illustrated by the dash-and-dot line of Fig. 7, when said flame escapes at the end of the subsonic ram-jet device through the outwardly diverging outlet 26, must be such that along the path $bc$, along which exists the heat exchange, the pilot flame temperature should not be substantially reduced in order to make sure that in all circumstances the ignition temperature of the main bulk of the mixture should be reached before the latter arrives at $e$ at the end of the pilot flame.

Should said condition fail to be complied with, on account of the pilot flame being too weak, or of inadequate proportions between pilot and main fuel output or again of excessive velocities of the main air-fuel mixture, flame stabilizers 27 and 28 (Figs. 4 and 5) may be provided, in the form of arcuate members mounted between the pilot combustion devices A. Said flame stabilizers have a V-shaped section the tapering part of which is pointed towards the principal injectors and are secured on the walls of the pilot combustion devices A at the rear-end of the assembly.

The above described device operates as follows:

When starting, the supersonic ram-jet engine is propelled up to a predetermined speed by means of auxiliary propellers. From the moment the chemical ignitors are ignited, the sequence of following operations take place as follows during a few seconds.

The central injector 9 fed with fuel under pressure and the holes thereof are radially directed towards the axes of the perforations formed in the flame-guard 11 and of the flame tubes 13, injects into the chamber 10 a fuel jet which burns under the action of the chemical ignitor or ignitors 8; the fuel flames combine then with those of the chemical ignitor device when passing through the flame tubes 13 and spread out at the rear of the flame stabilizers 3 of the pilot combustion devices A into which the fuel is injected through the injection tubes 4; the air entering the subsonic ram-jet devices acts in pulverizing the fuel jet which starts burning behind the flame stabilizers 3 under the action of the radiating flames emerging out of the flame tubes 13; the pilot flames leaving the subsonic ram-jet devices A will then ignite the injected fuel-air mixture within the intervals C, fuel being fed through the main I-shaped injectors 16 and/or through the V-shaped injectors 19, any steadying effect resulting from the action of these injectors being then enhanced due to the action of flame stabilizers 27 and 28 in increasing the whirling and, in consequence the heating time of the main mixture through pilot flame radiation.

The above-described device complies perfectly with the optimum conditions required for a supersonic ram-jet engine, giving a steady flame in spite of large variations of the mixture richness, low losses of head, good combustion yields, reduced lengths and good ignition at high Mach numbers.

Figure 11:
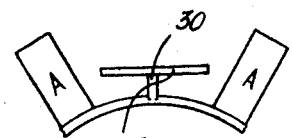
Figs. 11 and 12 are schematic aspects of two alternative embodiments of the main injectors.
Figure 12:
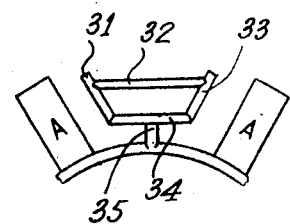

In case the small subsonic flattened and streamlined ram-jet devices should number less than eight, an appropriate subdivision of the fuel in the intervals defined between said ram-jet devices in conformity with the number of said intervals and the shape of their sections close to the main injectors, said main injectors may be embodied as illustrated in Figs. 11 and 12, which illustrate the case of six ram-jet devices, in order to take the place respectively of the I-shaped and V-shaped injectors of the above described device comprising eight subsonic ram-jet devices.

The fuel injector shown in Fig. 11, which is to replace the I-shaped injector its given a T-shape, each one of the tubes 29 and 30 being provided with injection holes. In the case of the fuel injector illustrated by Fig. 12, which is to replace the V-shaped injector, use is made of a shape reminding a closed-up lyre, being the tubes 31, 32 and 33 provided with injection holes, leaving without injection holes the lower structure tube 34 as well as the supporting tube 35.

The combustion device according to the invention may apply as well to ram-jet engines having a diffusor without central core as to ram-jet engines having a central core.

In the first case, as illustrated in Fig. 1, the combustion device 28 according to the invention is secured inside of the ram-jet engine on its cylindrical wall 29 about the end part of the diffusor 30, being the front part 31 of the central piece of said device provided with a cowl, the fuel ducts arriving from the outside and entering the small subsonic ram-jet devices.

Figure 2:
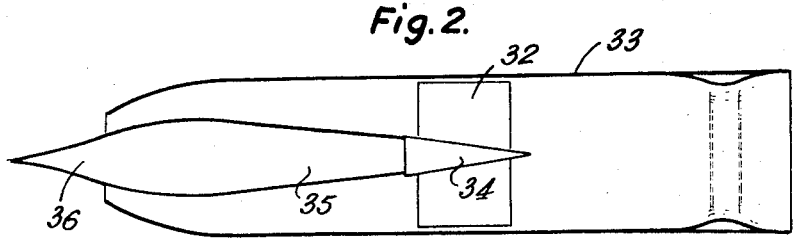
Fig. 2 is a schematic section of a supersonic ram-jet engine with a central core and including a combustion device in accordance with the invention.
Figure 3:
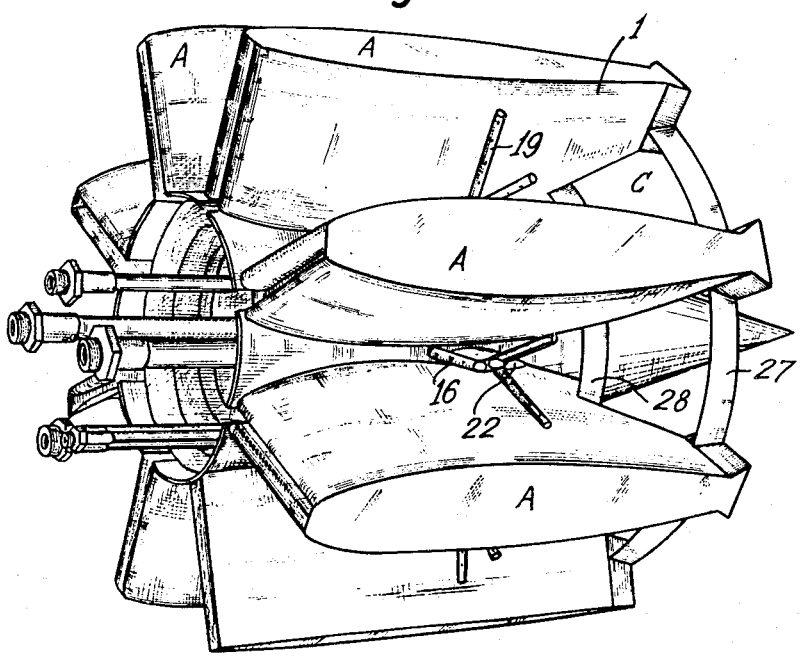
Fig. 3 is an outside perspective view of a combustion device in accordance with the invention.
Figure 5:
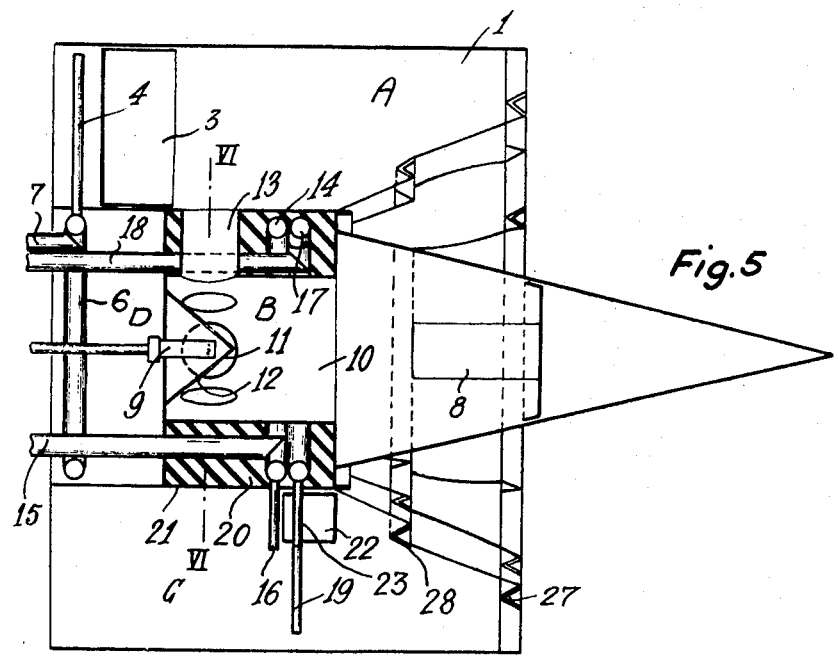
Fig. 5 is a section of Fig. 4 along the line V—V.
Figure 4:
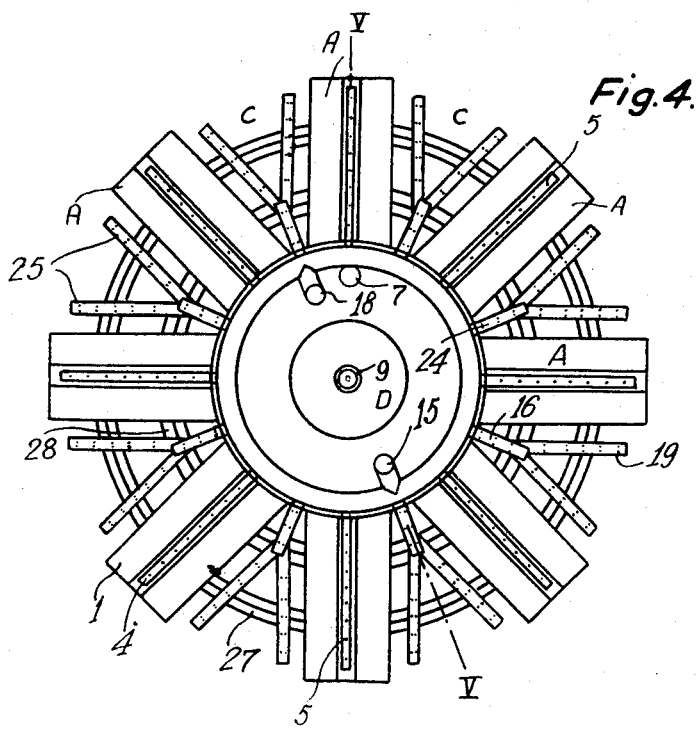
Fig. 4 is a front view of the device illustrated in Fig. 3, the dimensions of the spray holes having been deliberately enlarged for better understanding of the drawing.

In the second case, i.e. for supersonic ram-jet devices working at greater velocities, the combustion device in conformity with the invention is secured inside of the envelope 33 of the ram-jet engine on the tapered end of the rear cone-shaped terminal of the central core 35, the front cone 30 of which is protruding at the air entrance of the diffusor (Fig. 2).

Obviously many modifications may be made to the device as described hereinabove without departing from the scope of the present invention as defined in the appended claims. The pilot combustion devices may be different in number, said number being determined in connection, on the one part, with the efficiency of steadiness obtained for the main flame and, on the other part, with the loss of head of the whole apparatus.

What I claim is:

1. In a combustion device for supersonic ram-jet engines having a single central igniting device protected against any circulation of extraneous fluid and, radially disposed around said igniting device, a multiplicity of small subsonic ram-jet devices acting as pilot combustion devices, connected by radial flame tubes to said central igniting device and between which are arranged main injectors forming a main fuel injection assembly; the improvement which comprises for each small ram-jet device two streamlined lateral walls forming a flattened combustion chamber radially opened at its front and rear parts, an inlet diffuser mounted in said chamber adjacent the front open end of said chamber and adapted to decrease the speed of the air flowing through said chamber down to a relatively small value, a flame stabilizer arranged in said chamber upstream of the opening of the corresponding radial flame tube, and an injection tube radially mounted in said chamber upstream of said flame stabiliser, a hollow torus-shaped member carrying the injection tubes and arranged in the cylindrical recess defined by the ram-jet device, and a fuel feeding tube connected to said hollow member, said lateral walls ending downstream through a radial divergent outlet.

2. A combustion device according to claim 1, wherein each flame stabilizer consists of a metallic member having a dihedral shape the edge of which is radially directed while facing the injection tube.

3. A combustion device according to claim 1, wherein each injection tube is provided with a multiplicity of holes along its front generatrix.

4. A combustion device according to claim 1, further comprising flame stabilizing means arranged at the rear portion of each interval existing between two adjacent subsonic ram-jet devices and having two arcuate elements of different diameters secured on the facing lateral walls of each pair of adjacent subsonic ram-jet devices, said elements having a V-shaped cross-section the tapering part of which is pointed towards the main injectors.

5. In a combustion device for supersonic ram-jet engines having a single central igniting device protected against any circulation of extraneous fluid and, radially disposed around said igniting device, a multiplicity of small subsonic ram-jet devices acting as pilot combustion devices, connected by radial flame tubes to said central igniting device and between which are arranged main injectors forming a main fuel injection assembly; the improvement which comprises as central igniting device a central chamber closed by front and rear walls, at least one chemical igniter mounted in said chamber on the rear wall thereof, a central fuel injector axially mounted in said chamber on the front wall thereof and having a multiplicity of holes radially disposed in a common plane substantially passing through the axes of the radial flame tubes, and a conical flame-guard element the base of which is secured on said front wall, said element surrounding said fuel injector and being provided with perforations centered on said axes.

6. In a combustion device for supersonic ram-jet engines having a single central igniting device protected against any circulation of extraneous fluid and, radially disposed around said igniting device, a multiplicity of small subsonic ram-jet devices acting as pilot combustion devices, connected by radial flame tubes to said central igniting device and between which are arranged main injectors forming a main fuel injection assembly; the improvement which comprises as main fuel injection assembly groups of injectors provided with a multiplicity of holes and substantially arranged respectively in the narrowest cross-section of the intervals existing between the successive ram-jet devices, the injectors of each group having a shape adapted to give an appropriate distribution of the fuel in the mass of air passing through the corresponding interval in accordance with the number and the shape of said sections, and means for feeding said injectors with fuel, each group of injectors comprising first injector located in the narrowest section of the interval existing between two successive subsonic ram-jet devices, a second injector located downwards of the first, having a radial length and a transverse width greater than those of said first injector and only provided with injection holes on its parts projecting laterally and radially beyond said first injector, and a protective streamlined element arranged around the part of said second injector which axially registers with the first injector.

7. A combustion device according to claim 6, wherein, when said device comprises eight subsonic ram-jet devices, each group of injectors comprises an I-shaped radial injector and a Y-shaped injector radially disposed downwards of said I-shaped injector, said Y-shaped injector being provided with holes only on its divergent legs which are substantially parallel to the lateral walls of the adjacent subsonic ram-jet devices.

8. A combustion device according to claim 6, wherein, when said device comprises six subsonic ram-jet devices, the group of injectors comprises a T-shaped injector the central leg of which is radially directed, said central leg and the transverse leg being provided with injection holes, and an injector having the shape of a closed lyre disposed downwards of said T-shaped injector and the lateral and upper tubes of which are provided with injection holes, said lateral and upper tubes being respectively arranged laterally with respect to the transverse leg of the T-shaped injector and at a level higher than that of said transverse leg.

9. A combustion device according to claim 6, wherein the means for feeding the main injectors with fuel comprises two hollow torus-shaped elements arranged around the central igniting device and respectively connected to the front and rear injectors, and fuel feeding tubes, respectively connected to said elements.

10. A combustion device according to claim 9, further comprising means for insulating the torus-shaped elements from the heat resulting from the central igniting device.

11. A combustion device according to claim 10, wherein the means for heat-insulating the torus-shaped elements comprises a casing surrounding the central igniting device and defining with the subsonic ram-jet devices an annular space within which are housed the torus-shaped elements with their fuel feed tubes and through which pass the flame tubes, and a packing of heat-insulating material disposed in said casing around said elements and said flame tubes.

References Cited in the file of this patent

UNITED STATES PATENTS

| | | |
|---|---|---|
| 2,482,505 | Pierce | Sept. 20, 1949 |
| 2,640,321 | Pouchot | June 2, 1953 |
| 2,679,137 | Probert | May 25, 1954 |
| 2,725,718 | Sheets | Dec. 6, 1955 |
| 2,729,059 | Foure et al. | Jan. 3, 1956 |
| 2,775,867 | Collins | Jan. 1, 1957 |
| 2,780,916 | Collins | Feb. 12, 1957 |
| 2,872,785 | Barret et al. | Feb. 10, 1959 |

FOREIGN PATENTS

| | | |
|---|---|---|
| 676,641 | Great Britain | June 25, 1952 |